(12) United States Patent
Jahnke et al.

(10) Patent No.: US 11,975,969 B2
(45) Date of Patent: May 7, 2024

(54) STEAM METHANE REFORMING UNIT FOR CARBON CAPTURE

(71) Applicant: FuelCell Energy, Inc., Danbury, CT (US)

(72) Inventors: Fred C. Jahnke, Rye, NY (US); Stephen Jolly, Middlebury, CT (US); Hossein Ghezel-Ayagh, New Milford, CT (US)

(73) Assignee: FuelCell Energy, Inc., Danbury, CT (US)

(*) Notice: Subject to any disclaimer, the term of this patent is extended or adjusted under 35 U.S.C. 154(b) by 44 days.

(21) Appl. No.: 17/194,597

(22) Filed: Mar. 8, 2021

(65) Prior Publication Data

US 2021/0284530 A1 Sep. 16, 2021

Related U.S. Application Data (60) Provisional application No. 62/987,985, filed on Mar. 11, 2020.

(51) Int. Cl.
*C01B 3/56* (2006.01)
*F25J 1/00* (2006.01)
(Continued)

(52) U.S. Cl.
CPC .............. *C01B 3/56* (2013.01); *F25J 1/0027* (2013.01); *H01M 8/04007* (2013.01);
(Continued)

(58) Field of Classification Search
CPC ........ C01B 2203/0233; C01B 2203/86; C01B 2203/066; C01B 3/56; H01M 8/0618;
(Continued)

(56) References Cited

U.S. PATENT DOCUMENTS

| 4,449,994 A | 5/1984 | Hegarty et al. |
| 4,476,633 A | 10/1984 | Shah et al. |

(Continued)

FOREIGN PATENT DOCUMENTS

| CA | 2956439 C | 4/2017 |
| CN | 101285004 A | 10/2008 |

(Continued)

OTHER PUBLICATIONS

PCT International Search Report and Written Opinion dated Jun. 16, 2021 in International Application No. PCT/IB2021/051922 (11 pages).

(Continued)

*Primary Examiner* — Nicholas A Smith
(74) *Attorney, Agent, or Firm* — Foley & Lardner LLP (57) ABSTRACT

A molten carbonate fuel cell-powered system for capturing carbon dioxide produced by a steam methane reformer system. Tail gas from a pressure swing adsorption system is mixed with exhaust gas from the fuel cell anode, then pressurized and cooled to extract liquefied carbon dioxide. The residual low-$CO_2$ gas is directed to an anode gas oxidizer, to the anode, to the reformer to be burned for fuel, and/or to the pressure swing adsorption system. Low-$CO_2$ flue gas from the reformer can be vented to the atmosphere or directed to the anode gas oxidizer. Reduction in the amount of $CO_2$ reaching the fuel cell allows the fuel cell to be sized according to the power demands of the system and eliminates the need to export additional power output.

21 Claims, 6 Drawing Sheets

(51) Int. Cl.
- *H01M 8/04007* (2016.01)
- *H01M 8/0612* (2016.01)
- *H01M 8/0656* (2016.01)
- *H01M 8/14* (2006.01)
- *H01M 16/00* (2006.01)

(52) U.S. Cl.
CPC ....... *H01M 8/0618* (2013.01); *H01M 8/0656* (2013.01); *H01M 8/14* (2013.01); *H01M 16/003* (2013.01); *C01B 2203/0233* (2013.01); *C01B 2203/0425* (2013.01); *C01B 2203/0475* (2013.01); *C01B 2203/066* (2013.01); *C01B 2203/0872* (2013.01); *C01B 2203/148* (2013.01); *C01B 2203/86* (2013.01); *F25J 2205/50* (2013.01); *F25J 2215/80* (2013.01); *H01M 2008/147* (2013.01); *Y02C 20/40* (2020.08)

(58) Field of Classification Search
CPC .............. H01M 2008/147; F25J 1/0027; F25J 2215/80

See application file for complete search history.

(56) References Cited

U.S. PATENT DOCUMENTS

| | | | |
|---|---|---|---|
| 4,476,683 A | 10/1984 | Shah et al. | |
| 4,532,192 A | 7/1985 | Baker et al. | |
| 4,828,940 A | 5/1989 | Cohen et al. | |
| 5,518,828 A | 5/1996 | Senetar | |
| 6,063,515 A | 5/2000 | Epp et al. | |
| 6,162,556 A | 12/2000 | Vollmar et al. | |
| 6,280,865 B1 | 8/2001 | Eisman et al. | |
| 6,517,963 B2 | 2/2003 | Lakshmanan et al. | |
| 6,660,069 B2 | 12/2003 | Sato et al. | |
| 6,821,664 B2 | 11/2004 | Parks et al. | |
| 6,833,207 B2 | 12/2004 | Joos et al. | |
| 6,866,950 B2 | 3/2005 | Connor et al. | |
| 6,887,601 B2 | 5/2005 | Moulthrop et al. | |
| 6,924,053 B2 | 8/2005 | McElroy | |
| 6,994,929 B2 | 2/2006 | Barbir et al. | |
| 7,011,903 B2 | 3/2006 | Benson et al. | |
| 7,014,940 B2 | 3/2006 | Hase et al. | |
| 7,041,272 B2 | 5/2006 | Keefer et al. | |
| 7,045,233 B2 | 5/2006 | McElroy et al. | |
| 7,097,925 B2 | 8/2006 | Keefer | |
| 7,132,182 B2 | 11/2006 | McElroy et al. | |
| 7,141,323 B2 | 11/2006 | Ballantine et al. | |
| 7,255,949 B2 | 8/2007 | Coors et al. | |
| 7,276,306 B2 | 10/2007 | Pham et al. | |
| 7,285,350 B2 | 10/2007 | Keefer et al. | |
| 7,416,800 B2 | 8/2008 | Benson et al. | |
| 7,482,078 B2 | 1/2009 | Sridhar et al. | |
| 7,520,916 B2 | 4/2009 | McElroy et al. | |
| 7,591,880 B2 | 9/2009 | Levan et al. | |
| 7,601,207 B2 | 10/2009 | Moulthrop et al. | |
| 7,604,684 B2 | 10/2009 | Menzel | |
| 7,674,539 B2 | 3/2010 | Keefer et al. | |
| 7,691,507 B2 | 4/2010 | Ballantine et al. | |
| 7,752,848 B2 | 7/2010 | Balan et al. | |
| 7,833,668 B2 | 11/2010 | Ballantine et al. | |
| 7,846,599 B2 | 12/2010 | Ballantine et al. | |
| 7,883,803 B2 | 2/2011 | McElroy et al. | |
| 7,968,237 B2 | 6/2011 | Grieve et al. | |
| 8,062,799 B2 | 11/2011 | Jahnke et al. | |
| 8,071,241 B2 | 12/2011 | Sridhar et al. | |
| 8,101,307 B2 | 1/2012 | Mcelroy et al. | |
| 8,158,290 B2 | 4/2012 | Penev et al. | |
| 8,241,400 B2 | 8/2012 | Grover | |
| 8,293,412 B2 | 10/2012 | Mcelroy | |
| 8,343,671 B2 | 1/2013 | Qi | |
| 8,530,101 B2 | 9/2013 | Qi | |
| 8,790,618 B2 | 7/2014 | Adams et al. | |
| 8,815,462 B2 | 8/2014 | Ghezel-Ayagh et al. | |
| 9,315,397 B2 | 4/2016 | Sivret | |
| 9,365,131 B2 | 6/2016 | Jamal et al. | |
| 9,455,458 B2 | 9/2016 | Yu et al. | |
| 9,455,463 B2 | 9/2016 | Berlowitz et al. | |
| 9,499,403 B2 | 11/2016 | Al-Muhaish et al. | |
| 9,502,728 B1 | 11/2016 | Farooque et al. | |
| 9,520,607 B2 | 12/2016 | Berlowitz et al. | |
| 9,531,024 B2 | 12/2016 | Pollica et al. | |
| 9,586,171 B2 | 3/2017 | Vanzandt et al. | |
| 9,861,931 B2 | 1/2018 | Kuopanportti et al. | |
| 2002/0142198 A1 | 10/2002 | Towler et al. | |
| 2003/0013448 A1 | 1/2003 | Dillinger et al. | |
| 2003/0143448 A1 | 7/2003 | Keefer | |
| 2003/0157383 A1 | 8/2003 | Takahashi | |
| 2003/0207161 A1 | 11/2003 | Rusta-Sallehy et al. | |
| 2004/0028979 A1 | 2/2004 | Ballantine et al. | |
| 2004/0146760 A1 | 7/2004 | Miwa | |
| 2004/0166384 A1 | 8/2004 | Schafer | |
| 2004/0197612 A1 | 10/2004 | Keefer et al. | |
| 2004/0221578 A1 | 11/2004 | Iijima et al. | |
| 2004/0229102 A1 | 11/2004 | Jahnke et al. | |
| 2005/0003247 A1 | 1/2005 | Pham | |
| 2005/0074657 A1 | 4/2005 | Rusta-Sallehy et al. | |
| 2005/0098034 A1 | 5/2005 | Gittleman et al. | |
| 2005/0123810 A1 | 6/2005 | Balan | |
| 2005/0227137 A1 | 10/2005 | Suga | |
| 2005/0233188 A1 | 10/2005 | Kurashima et al. | |
| 2005/0271914 A1 | 12/2005 | Farooque et al. | |
| 2006/0115691 A1 | 6/2006 | Hilmen et al. | |
| 2006/0188761 A1 | 8/2006 | O'Brien et al. | |
| 2007/0009774 A1 | 1/2007 | Clawson et al. | |
| 2007/0031718 A1 | 2/2007 | Fujimura et al. | |
| 2007/0044657 A1 | 3/2007 | Laven et al. | |
| 2007/0065688 A1 | 3/2007 | Shimazu et al. | |
| 2007/0111054 A1 | 5/2007 | Gottmann et al. | |
| 2007/0141409 A1 | 6/2007 | Cho et al. | |
| 2007/0178338 A1 | 8/2007 | McElroy et al. | |
| 2007/0193885 A1 | 8/2007 | Benicewicz et al. | |
| 2007/0243475 A1 | 10/2007 | Funada et al. | |
| 2007/0246363 A1 | 10/2007 | Eisman et al. | |
| 2007/0246374 A1 | 10/2007 | Eisman et al. | |
| 2008/0063910 A1 | 3/2008 | Okuyama et al. | |
| 2008/0171244 A1 | 7/2008 | Okuyama et al. | |
| 2008/0241612 A1 | 10/2008 | Ballantine et al. | |
| 2008/0241638 A1 | 10/2008 | McElroy et al. | |
| 2008/0245101 A1 | 10/2008 | Dubettier-Grenier et al. | |
| 2008/0292921 A1 | 11/2008 | Lakshmanan et al. | |
| 2008/0299425 A1 | 12/2008 | Kivisaari et al. | |
| 2008/0311445 A1 | 12/2008 | Venkataraman et al. | |
| 2009/0068512 A1 | 3/2009 | Gofer et al. | |
| 2009/0084085 A1 | 4/2009 | Kawai | |
| 2009/0155637 A1 | 6/2009 | Cui et al. | |
| 2009/0155644 A1 | 6/2009 | Cui et al. | |
| 2009/0155645 A1 | 6/2009 | Cui et al. | |
| 2009/0155650 A1 | 6/2009 | Cui et al. | |
| 2009/0186244 A1 | 7/2009 | Mayer | |
| 2010/0028730 A1 | 2/2010 | Ghezel-Ayagh | |
| 2010/0047641 A1 | 2/2010 | Jahnke et al. | |
| 2010/0104903 A1 | 4/2010 | Gummalla et al. | |
| 2010/0126180 A1 | 5/2010 | Forsyth et al. | |
| 2010/0199559 A1 | 8/2010 | Hallett et al. | |
| 2010/0239924 A1 | 9/2010 | Mcelroy et al. | |
| 2010/0243475 A1 | 9/2010 | Eisman et al. | |
| 2010/0266923 A1 | 10/2010 | Mcelroy et al. | |
| 2010/0279181 A1 | 11/2010 | Adams et al. | |
| 2012/0000243 A1 | 1/2012 | Bough et al. | |
| 2012/0034538 A1 | 2/2012 | Jahnke et al. | |
| 2012/0058042 A1 | 3/2012 | Zauderer | |
| 2012/0167620 A1 | 7/2012 | Van Dorst et al. | |
| 2012/0189922 A1 | 7/2012 | Schmidt et al. | |
| 2012/0291483 A1 | 11/2012 | Terrien et al. | |
| 2013/0014484 A1 | 1/2013 | Caprile et al. | |
| 2013/0111948 A1 | 5/2013 | Higginbotham | |
| 2013/0126038 A1* | 5/2013 | Jamal | C01B 3/384 429/411 |
| 2013/0259780 A1 | 10/2013 | Handagama et al. | |
| 2014/0260310 A1 | 9/2014 | Berlowitz et al. | |
| 2014/0302413 A1 | 10/2014 | Berlowitz | |
| 2014/0329160 A1 | 11/2014 | Ramaswamy et al. | |

(56) References Cited

U.S. PATENT DOCUMENTS

| | | |
|---|---|---|
| 2014/0352309 A1 | 12/2014 | Kim et al. |
| 2015/0089951 A1 | 4/2015 | Barckholtz et al. |
| 2015/0111160 A1 | 4/2015 | Brunhuber et al. |
| 2015/0122122 A1 | 5/2015 | W Mustapa et al. |
| 2015/0191351 A1 | 7/2015 | Darde et al. |
| 2015/0266393 A1 | 9/2015 | Jamal et al. |
| 2015/0280265 A1 | 10/2015 | Mclarty |
| 2015/0321914 A1* | 11/2015 | Darde ............... C01B 5/00 422/162 |
| 2016/0248110 A1 | 8/2016 | Ghezel-Ayagh |
| 2016/0265122 A1 | 9/2016 | Zhu et al. |
| 2016/0351930 A1 | 12/2016 | Jahnke et al. |
| 2016/0365590 A1 | 12/2016 | Zheng et al. |
| 2016/0365594 A1 | 12/2016 | Zheng et al. |
| 2017/0130582 A1 | 5/2017 | Hsu |
| 2017/0141421 A1 | 5/2017 | Sundaram et al. |
| 2017/0250429 A1 | 8/2017 | Diethelm et al. |
| 2020/0307997 A1* | 10/2020 | Tranier ............... F25J 3/0223 |

FOREIGN PATENT DOCUMENTS

| | | |
|---|---|---|
| CN | 101809396 A | 8/2010 |
| CN | 102422108 A | 4/2012 |
| CN | 104847424 A | 8/2015 |
| CN | 105050945 A | 11/2015 |
| CN | 107251297 A | 10/2017 |
| EP | 1 306 916 A1 | 5/2003 |
| EP | 1 790 027 A2 | 5/2007 |
| EP | 2 589 902 A2 | 5/2013 |
| EP | 1 841 515 B1 | 6/2016 |
| EP | 2 011 183 B1 | 6/2016 |
| EP | 1 996 533 B1 | 7/2016 |
| EP | 1 273 061 B1 | 8/2016 |
| EP | 1 344 270 B1 | 6/2017 |
| EP | 2 589 908 A2 | 8/2018 |
| EP | 3 360 189 A1 | 8/2018 |
| IT | 102009901749803 A1 | 1/2011 |
| JP | S62-241524 A | 10/1987 |
| JP | 02-281569 A | 11/1990 |
| JP | H04-334870 A | 11/1992 |
| JP | 41-1312527 A | 11/1999 |
| JP | H11-312527 A | 11/1999 |
| JP | 2001-023670 A | 1/2001 |
| JP | 2002-334714 A | 11/2002 |
| JP | 2004-171802 A | 6/2004 |
| JP | 2005-179083 A | 7/2005 |
| JP | 2007-018907 A | 1/2007 |
| JP | 2007-201349 A | 8/2007 |
| JP | 2008-507113 A | 3/2008 |
| JP | 2009-503788 A | 1/2009 |
| JP | 2009-503790 A | 1/2009 |
| JP | 2009-108241 A | 5/2009 |
| JP | 2010-055927 A | 3/2010 |
| JP | 2010-228963 A | 10/2010 |
| JP | 2011-141967 A | 7/2011 |
| JP | 2011-181440 A | 9/2011 |
| JP | 2011-207741 A | 10/2011 |
| JP | 2012-519649 A | 8/2012 |
| JP | 2012-531719 A | 12/2012 |
| JP | 2016-115479 A | 6/2016 |
| KR | 1020130075492 A | 7/2013 |
| WO | WO-2007/015689 A2 | 2/2007 |
| WO | WO-2009/013455 A2 | 1/2009 |
| WO | WO-2009/059571 A1 | 5/2009 |
| WO | WO-2011/089382 A2 | 7/2011 |
| WO | WO-2012/176176 A1 | 12/2012 |
| WO | WO-2014/151207 A1 | 9/2014 |
| WO | WO-2015/059507 A1 | 4/2015 |
| WO | WO-2015/116964 A1 | 8/2015 |
| WO | WO-2015/124183 A1 | 8/2015 |
| WO | WO-2015/124700 A1 | 8/2015 |
| WO | WO-2015/133757 A1 | 9/2015 |
| WO | WO-2016/100849 A1 | 6/2016 |
| WO | WO-2016/196952 A1 | 12/2016 |
| WO | WO-2019/175850 | 9/2019 |

OTHER PUBLICATIONS

Anonymous: 11 PROX—Wikipedia, Dec. 29, 2015 (Dec. 29, 2015), XP055569545, Retrieved from the Internet: URL:https://en.wikipedia.org/w/index.php?title=PROX&oldid=697317259 [retrieved on Mar. 14, 2019].

Communication pursuant to Article 94(3) EPC in EP 17786599.5 dated Jan. 30, 2020 (6 pages).

Extended European Search Report for EP17786599.5 dated May 20, 2019 (7 pages).

Extended European Search Report in EP17786629.0 dated Mar. 26, 2019 (9 pages).

Extended European Search Report in EP17790107.1 dated Nov. 29, 2019 (7 pages).

Extended European Search Report in EP21154960.5 dated May 17, 2021 (9 pages).

Final Office Action on U.S. Appl. No. 16/094,792 dated Aug. 18, 2020.

First Office Action in JP 2018-554735 dated Nov. 11, 2019, with English translation (8 pages).

First Office Action in JP 2018-555215 dated Dec. 20, 2019, with English machine translation (8 pages).

First Office Action in JP 2018-556825 dated Feb. 25, 2020, with English translation (14 pages).

International Preliminary Report on Patentability in PCT/US2016/035745 dated Dec. 14, 2017 (7 pages).

International Preliminary Report on Patentability in PCT/US2017/027261 dated Nov. 8, 2018 (8 pages).

International Preliminary Report on Patentability in PCT/US2017/028487 dated Oct. 23, 2018 (8 pages).

International Preliminary Report on Patentability in PCT/US2017/029667 dated Nov. 8, 2018 (6 pages).

International Search Report and Written Opinion dated Aug. 24, 2017 in PCT/US2017/028594 (13 pages).

International Search Report and Written Opinion dated Jul. 14, 2017 for PCT/US2017/029667 (7 pages).

International Search Report and Written Opinion in PCT/US2016/035745 dated Sep. 30, 2016 (10 pages.

International Search Report and Written Opinion in PCT/US2017/027261 dated Jul. 3, 2017 (10 pages).

International Search Report and Written Opinion in PCT/US2017/028487 dated Jul. 10, 2017 (8 pages).

International Search Report and Written Opinion in PCT/US2017/028526 dated Jul. 17, 2017 (8 pages).

Non-Final Office Action in U.S. Appl. No. 16/096,596 dated May 13, 2019.

Non-Final Office Action on U.S. Appl. No. 15/298,316 dated Jun. 22, 2018 (4 pages).

Non-Final Office Action on U.S. Appl. No. 16/095,261 dated Jan. 4, 2021.

Notice of Allowance in U.S. Appl. No. 16/095,281 dated Jul. 17, 2020.

Notice of Preliminary Rejection in KR 10-2018-7033320 dated Apr. 17, 2020, with English translation (15 pages).

Notice of Preliminary Rejection in KR 10-2018-7033915 dated Apr. 17, 2020, with English translation (13 pages).

Office Action in CA Pat Appl No. 2988295 dated Feb. 5, 2018 (4 pages).

Office Action in CA Pat. Appl. 3021632 dated Oct. 3, 2019 (3 pages).

Office Action in JP 2017-563016 dated Jul. 13, 2018 (5 pages, no translation available).

U.S. Office Action in U.S. Appl. No. 14/732,032 dated Dec. 16, 2015 (11 pages).

U.S. Office Action in U.S. Appl. No. 14/732,032 dated May 13, 2016 (14 pages).

* cited by examiner

STEAM METHANE REFORMING UNIT FOR CARBON CAPTURE

CROSS-REFERENCE TO RELATED PATENT APPLICATIONS

This application claims the benefit of and priority to U.S. Provisional Application No. 62/987,985, filed Mar. 11, 2020, the entire disclosure of which is hereby incorporated by reference herein.

BACKGROUND

The present disclosure relates to a Steam Methane Reformer (SMR). In particular, the present disclosure relates to a SMR with enhanced carbon dioxide ($CO_2$) capture.

Steam methane reformers (SMRs) are generally used to produce a syngas from a gas feedstock such as natural gas or refinery gas. The produced syngas can be further processed within the plant to yield various end products, including purified hydrogen, methanol, carbon monoxide, and ammonia. However, the flue gas produced during the reforming process contains contaminants, such as carbon dioxide, which are known to adversely affect the environment by contributing to overall climate change. SMR's are known to be one of the largest $CO_2$ emitters in refineries. As such, in recent years, many government regulatory bodies have required the reduction in emissions of carbon dioxide, into the atmosphere.

Given the recognition of the harmful effect of carbon dioxide release and recent restrictions on its emission, efforts have been made to efficiently remove carbon dioxide in a purified form from a flue gas produced by a steam reformer plant. By removing carbon dioxide from the flue gas, the carbon dioxide alternatively may be used for other, safer purposes, such as underground storage or oil production needs.

Current methods for $CO_2$ capture from SMRs, such as for example, using an amine absorption stripper system to remove $CO_2$ from flue gas (post combustion capture) or using physical or amine-based chemical solvents in a stripper system to remove $CO_2$ from the SMR tail gas (pre-combustion capture), are highly inefficient and costly. The stripping systems are generally too energy intensive, requiring significant quantities of steam to regenerate the solvents. The state-of the-art post-combustion method employing molten carbonate fuel cell (MCFC) technology generates power while capturing $CO_2$ from a host plant. The additional power generated beyond the requirements of the system itself provides a source of revenue which offsets system capital and operating costs. In the conventional post-combustion system, flue gas from the SMR containing high levels of $CO_2$ are directed into the MCFC. Due to the high levels of $CO_2$, this method requires a relatively large quantity of MCFC modules, which can be costly, and may produce more power than is desirable. As such, conventional MCFC-based $CO_2$ capture systems can be very expensive and may produce excess energy than cannot easily be unloaded.

SUMMARY

Embodiments described herein provide a SMR-$CO_2$ capture system that captures $CO_2$ from a tail gas of a pressure swing adsorption (PSA) system of a SMR system, which can, advantageously, help to capture $CO_2$ in a more efficient and cost effective manner, as compared to some conventional $CO_2$ capture systems.

In some embodiments, a system for capturing $CO_2$ from a SMR system comprises a MCFC, a compressor, a chiller, and a $CO_2$ separator. Exhaust gas from the anode of the MCFC may be mixed with tail gas from a PSA of the SMR system and compressed by the compressor. The mixed, compressed gas may be cooled by the chiller and fed into the $CO_2$ separator. The $CO_2$ separator separates liquefied $CO_2$ from the residual, uncondensed gas.

In various embodiments, the residual gas may be recycled into various parts of the SMR system or the system for capturing $CO_2$. For example, in some embodiments, a portion of the gas may be recycled to an anode gas oxidizer and then to a cathode of the MCFC, and another portion recycled into an anode of the MCFC. In some embodiments, a third portion of the residual gas may be recycled to the PSA of the SMR system to produce more hydrogen, or to a reformer in the SMR system to be burned as fuel. This third portion of residual gas may instead be recycled for use in a PSA outside the SMR system. In some embodiments, a third portion of the residual gas may be recycled to the PSA of the SMR system to produce more hydrogen, and a fourth portion of the residual gas may be recycled to a reformer in the SMR system to be burned as fuel.

In some embodiments, flue gas from a reformer of the SMR system may be vented to the atmosphere. Because the tail gas from the PSA of the SMR system is not burned to fuel the reformer of the SMR system, the flue gas is relatively low in $CO_2$. In other embodiments, the flue gas may be directed to an anode gas oxidizer in the system for capturing $CO_2$ and then to a cathode of the MCFC.

In some embodiments, the MCFC may be sized to power only the system for capturing $CO_2$, only the SMR system, or both. Because the tail gas from the PSA of the SMR system is not burned to fuel the reformer of the SMR system, the MCFC receives a reduced amount of $CO_2$, allowing the MCFC to be sized smaller and reducing excess power generation.

In some embodiments a system for capturing $CO_2$ from a SMR system comprises a compressor, a chiller, and a $CO_2$ separator, but excludes an MCFC as power for the system may be derived from an external power source such as an existing power plant, utility grid, and/or renewable power such as solar or wind power. Tail gas from a PSA of the SMR system is compressed by the compressor and cooled by the chiller. The $CO_2$ separator separates liquefied $CO_2$ from the residual, uncondensed gas. The uncondensed gas may then be recycled to the PSA of the SMR system and/or to the reformer of the SMR system to be burned as fuel.

In some embodiments, a method comprises mixing anode exhaust gas from the anode of a MCFC a with tail gas from the PSA of a SMR system, compressing the mixed gas with a compressor, cooling the mixed gas with a chiller, separating liquefied $CO_2$ from residual, uncompressed gas in a separator, and collecting the liquefied $CO_2$. In some embodiments, the residual gas may be recycled in varying amounts to an anode gas oxidizer coupled to a cathode of the MCFC, the anode of the MCFC, the PSA of the SMR system, and/or to a reformer of the SMR system to be burned as fuel.

The foregoing is a summary of the disclosure and thus by necessity contains simplifications, generalizations, and omissions of detail. Consequently, those skilled in the art will appreciate that the summary is illustrative only and is not intended to be in any way limiting. Other aspects, features, and advantages of the devices and/or processes described herein, as defined by the claims, will become apparent in the detailed description set forth herein and taken in conjunction with the accompanying drawings.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 2:
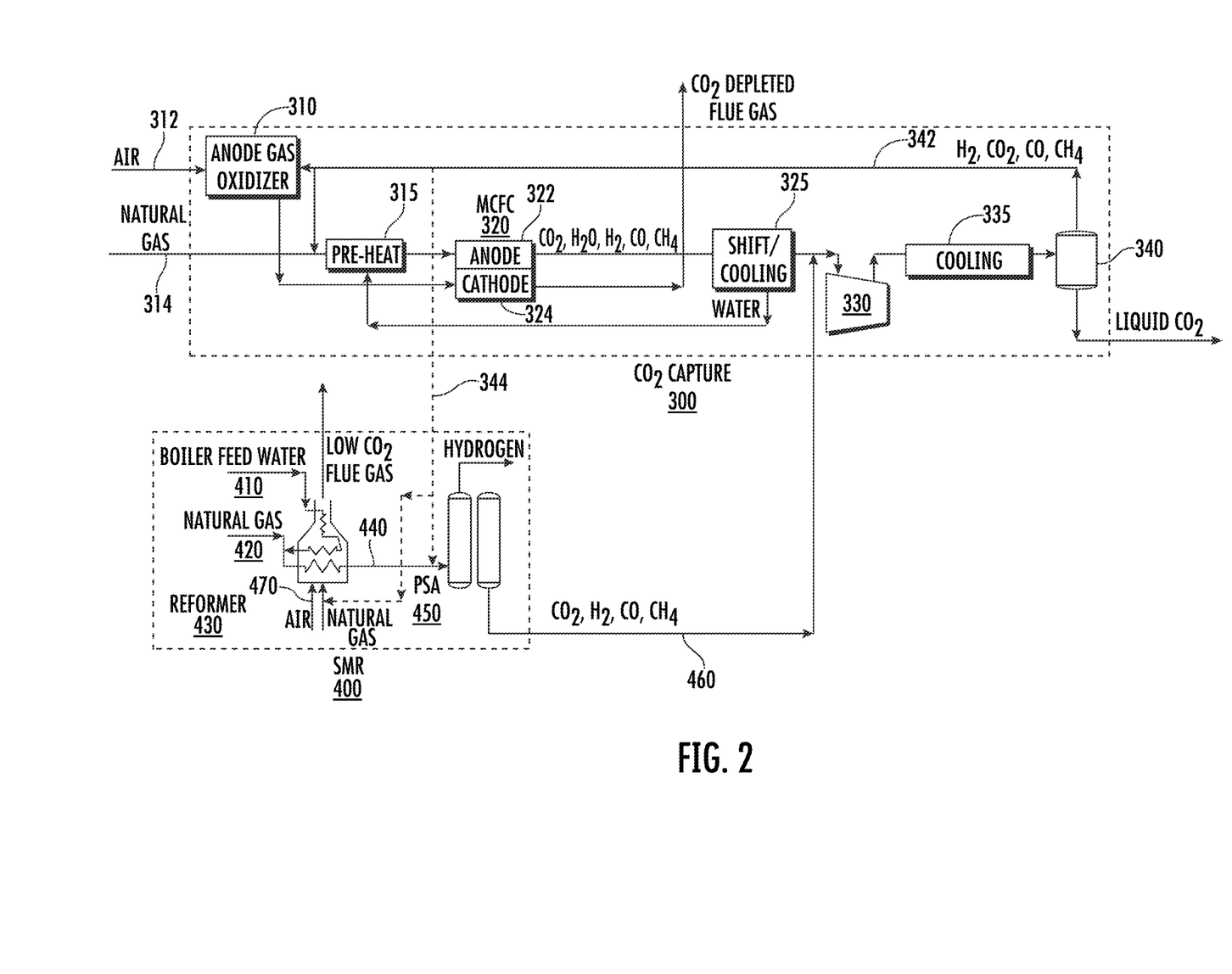
FIG. 2 shows a schematic view of a SMR-$CO_2$ capture system, in accordance with a representative embodiment of the present disclosure.

Referring generally to the figures, disclosed herein are various embodiments of an enhanced SMR-$CO_2$ capture system capable of capturing $CO_2$ in a more efficient and cost effective manner, as compared to some conventional $CO_2$ capture systems. The various embodiments disclosed herein may be capable of increasing the amount of $CO_2$ captured, improving efficiency of capturing $CO_2$, increasing the amount of hydrogen produced, and/or reducing costs associated with capturing $CO_2$. In the various embodiments disclosed herein, like reference numerals refer to like elements between Figures, but are increased by 200 from figure to figure (e.g., PSA 450 in FIG. 2 is the same as PSA 650 in FIG. 3, etc.).

Generally speaking, in a typical SMR unit of a SMR-$CO_2$ capture system, natural gas is reacted with water to form hydrogen and $CO_2$. Some methane is unconverted and some carbon monoxide is also generated in the process. These impurities, along with any water that is not separated out by condensation, is normally removed from the hydrogen using a PSA system, which can desorb these impurities at atmospheric pressure to generate a PSA tail gas that is generally high in $CO_2$ and also contains CO, methane, and hydrogen. Typically, the PSA tail gas is recycled as fuel in the SMR unit, where the gases are combusted with air to provide the heat needed for the endothermic reforming reaction. This reaction produces a flue gas having relatively high $CO_2$ content that can be directed to an MCFC for subsequent $CO_2$ capture. In this type of system configuration, the size of the MCFC is dictated, in part, by the amount (or percentage) of $CO_2$ to be transferred to the anode of the MCFC from the flue gas received from the SMR unit (e.g., 70%-90% of the $CO_2$).

However, the composition of the PSA tail gas is very similar to the shifted anode exhaust gas of the MCFC in the $CO_2$ capture system. Thus, Applicant advantageously determined that the PSA tail gas could be mixed directly with the anode exhaust gas of the MCFC before being compressed and cooled to separate the $CO_2$ from the gas, instead of recycling the PSA tail gas in the SMR unit. In this manner, the size of the MCFC is not dictated by the PSA tail gas from the SMR unit, since the $CO_2$ that is normally contained in the flue gas from the PSA tail gas is mixed with the anode exhaust gas downstream of the MCFC for subsequent $CO_2$ capture instead. Accordingly, the overall cost of the system can be reduced by selecting a smaller sized MCFC that can, for example, produce just enough power for the chiller and other electrical loads of the $CO_2$ capture system, the SMR system itself, or both, as discussed in greater detail below.

In some implementations, the system can also be configured to direct the flue gas from the SMR unit to the MCFC for additional $CO_2$ capture. In some implementations, the unused fuel from the anode of the MCFC containing hydrogen and carbon monoxide can be directed from a $CO_2$ capture tail gas to the PSA to increase the hydrogen production of the system. In some implementations, power is purchased from an external source instead of using an MCFC to power the $CO_2$ capture system.

Figure 1:
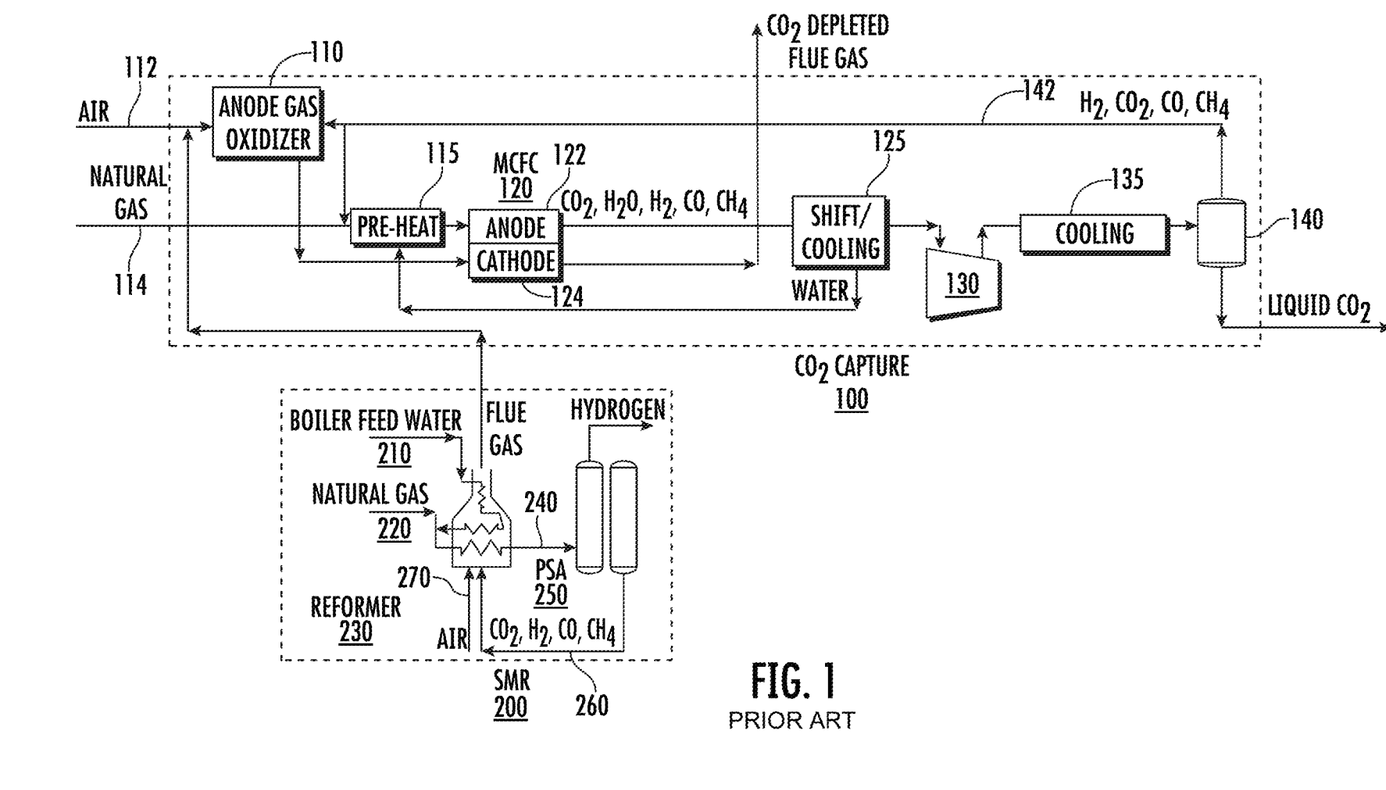
FIG. 1 shows a schematic view of a conventional SMR-$CO_2$ capture system.

FIG. 1 shows a typical SMR-$CO_2$ capture system. As shown in FIG. 1, steam supplied by a steam supply line 210 and natural gas supplied by a natural gas supply line 220 are mixed and fed to a reformer 230 of a reformer system 200 for converting the methane to hydrogen, $CO_2$, and CO. The reformer effluent may be transported to a shifting assembly of the reformer system 200, where the effluent may be cooled and most of the CO can be shifted to hydrogen according to the reaction:

$$CO + H_2O \leftrightarrow H_2 + CO_2$$

The shifted gas is then sent via shift gas line 240 to a PSA system 250 where the hydrogen is separated from the residual methane and CO in the gas along with the $CO_2$ produced from the reforming and shift reactions. The residual gases are recycled as fuel to the reformer 230 via a recycling line 260, where the gases are combusted with air supplied by an air supply line 270 to provide the heat needed for the endothermic reforming reaction. All of the $CO_2$ generated in the production of the hydrogen is vented in the reformer flue gas as a mixture of $N_2$, $CO_2$, and $H_2O$ with some NOx.

Still referring to FIG. 1, the reformer flue gas containing the $CO_2$ is sent to an AGO (anode gas oxidizer) 110 of a $CO_2$ capture system 100 where the flue gas is optionally combined with air, if required to increase the flue gas oxygen content to the level required for MCFC operation, from an air supply line 112. The flue gas and air are heated and fed into a cathode 124 of an MCFC 120. Natural gas is provided to a pre-heater 115 before being fed to an anode 122 of the MCFC 120 via a natural gas supply line 114. Due to the unique properties of the MCFC, $CO_3^=$ is transferred from the cathode 124 to the anode 122 of the MCFC 120 during normal power production of the MCFC. This transfer removes $CO_2$ and $O_2$ from the flue gas containing cathode feed and generates a cathode exhaust, which is relatively low in $CO_2$, thereby reducing $CO_2$ emissions. The $CO_3^=$ transferred to the anode 122 reacts with hydrogen in the anode 122 to form $H_2O$ and $CO_2$ while generating power. In the carbon capture process, the outlet stream from the anode 122 is cooled by, for example, an evaporator 125, and enters a shift reactor such that CO in the outlet stream is converted to hydrogen and $CO_2$ using the following shift reaction:

$$CO + H_2O \leftrightarrow H_2 + CO_2$$

The outlet stream is then compressed by a compressor 130 and then cooled by, for example, a chiller 135. The compressed and cooled outlet stream is then transferred to a $CO_2$ separator 140. In the compressed and cooled outlet stream, about 60% to about 90% of the $CO_2$ is condensed as a liquid and separated from a residual $CO_2$ capture tail gas containing hydrogen, any unconverted CO, the remaining uncondensed $CO_2$, and methane. The residual $CO_2$ capture tail gas is partially recycled to the anode 122 via a recycle line 142 to be used as fuel in the MCFC 120. The remainder of the residual $CO_2$ capture tail gas is sent to the AGO 110 to help to prevent buildup of inert gases, such as nitrogen, and to heat up the gas in the AGO 110 by combusting the remaining hydrogen gas from the residual $CO_2$ capture tail gas. This recycling has the advantage of increasing the amount of $CO_2$ recovered from the anode exhaust.

In the system of FIG. 1, the MCFC 120 is sized, in part, based on the amount of $CO_2$ in the flue gas to transfer to the anode 122 (e.g., about 70% to about 90% of the $CO_2$ in the flue gas). Thus, the system configuration of FIG. 1 can be costly to implement and may generate more power than desirable.

Referring now to FIG. 2, a SMR-$CO_2$ capture system including a $CO_2$ capture system 300 and a SMR system 400 is shown according to an exemplary embodiment of the present disclosure. In contrast to the system of FIG. 1, the flue gas from the SMR system 400 is not directed to the MCFC for $CO_2$ capture, but is instead vented since it has generally low $CO_2$ content. Instead, the SMR system 400 is configured such that a PSA tail gas from a PSA 450 in the SMR system 400 is mixed directly with an anode exhaust gas from an anode 322 of an MCFC 320, where the mixture can be compressed and cooled, such that liquefied $CO_2$ can be separated from the mixture to be captured. In this way, the size of the MCFC 320 is independent of the flue gas from the SMR reformer 430, such that the MCFC 320 may be sized to provide only the power needed by the $CO_2$ capture system 300, the SMR system 400, or both, thereby reducing the overall cost of the system while still providing adequate $CO_2$ capture.

Still referring to FIG. 2, steam supplied by a steam supply line 410 and natural gas supplied by a natural gas supply line 420 are mixed and fed to a SMR reformer 430 of a SMR system 400 for converting the methane to hydrogen, $CO_2$, and CO. The reformer effluent may be transported to a shifting assembly of the SMR system 400, where the effluent may be cooled and most of the CO can be shifted to hydrogen. The shifted gas is then sent via shift gas line 440 to a PSA 450 where the hydrogen is separated from the residual methane and CO in the gas along with the $CO_2$ produced from the reforming and shift reactions. Instead of recycling the residual gases in the PSA tail gas as fuel in the SMR reformer 430, as in the system of FIG. 1, the PSA tail gas is directed to the $CO_2$ capture system 300 by a PSA tail gas supply line 460 to be mixed directly with the anode exhaust gas of the anode 322 of the MCFC 320 for subsequent $CO_2$ capture. In this way, the size of the MCFC 320 is not dictated by the amount of $CO_2$ in the PSA tail gas to be transferred to the anode 322. The MCFC 320 can therefore be sized to any specifications, for example, to produce sufficient power for the $CO_2$ capture system 300, the SMR system 400, or both.

Still referring to FIG. 2, the mixture of anode exhaust gas and the PSA tail gas is then compressed by a compressor 330 and then cooled by, for example, a chiller 335. The compressed and cooled outlet stream is then transferred to a $CO_2$ separator 340. In the compressed and cooled outlet stream, about 60% to about 90% of the $CO_2$ is condensed as a liquid and separated from a residual $CO_2$ capture tail gas containing hydrogen, any unconverted CO, the remaining uncondensed $CO_2$, and methane. A portion of the $CO_2$ capture tail gas stream is recycled to the anode 322 via a recycle line 342 to be used as fuel in the MCFC 320, with a small portion of the tail gas also being sent to the AGO 310 to help to prevent buildup of inert gases, such as nitrogen, and to heat up the gas in the AGO 310 by combusting the remaining hydrogen gas from the residual $CO_2$ capture tail gas.

In the system configuration of FIG. 2, the PSA tail gas is no longer being directed back to the SMR Reformer 430 for subsequent burning. As such, natural gas may be used instead to provide fuel to SMR Reformer 430, and the resulting flue gas containing a relatively low amount of $CO_2$ can be vented as a mixture of $N_2$, $CO_2$, and $H_2O$ with some NOx as allowed by regulation. In this configuration, about 50% to about 60% of the $CO_2$ normally emitted from the SMR is captured.

According to another representative embodiment shown in FIG. 2, a portion of the residual $CO_2$ capture tail gas may also be directed back to SMR Reformer 430 by a $CO_2$ capture tail gas supply line 344 (represented by dashed lines/arrows). The portion of the residual $CO_2$ capture tail gas can be used as fuel in SMR Reformer 430, so as to reduce the amount of natural gas required. The portion of the residual $CO_2$ capture tail gas may also be recycled to the PSA 450, as shown in FIG. 2, to increase the $H_2$ production of the PSA without increasing the size of SMR Reformer 430. According to another representative embodiment, the MCFC 320 may be sized to use only the residual $CO_2$ capture tail gas as fuel, thereby eliminating the need for natural gas at the MCFC 320, except for startup and upset operations.

Figure 3:
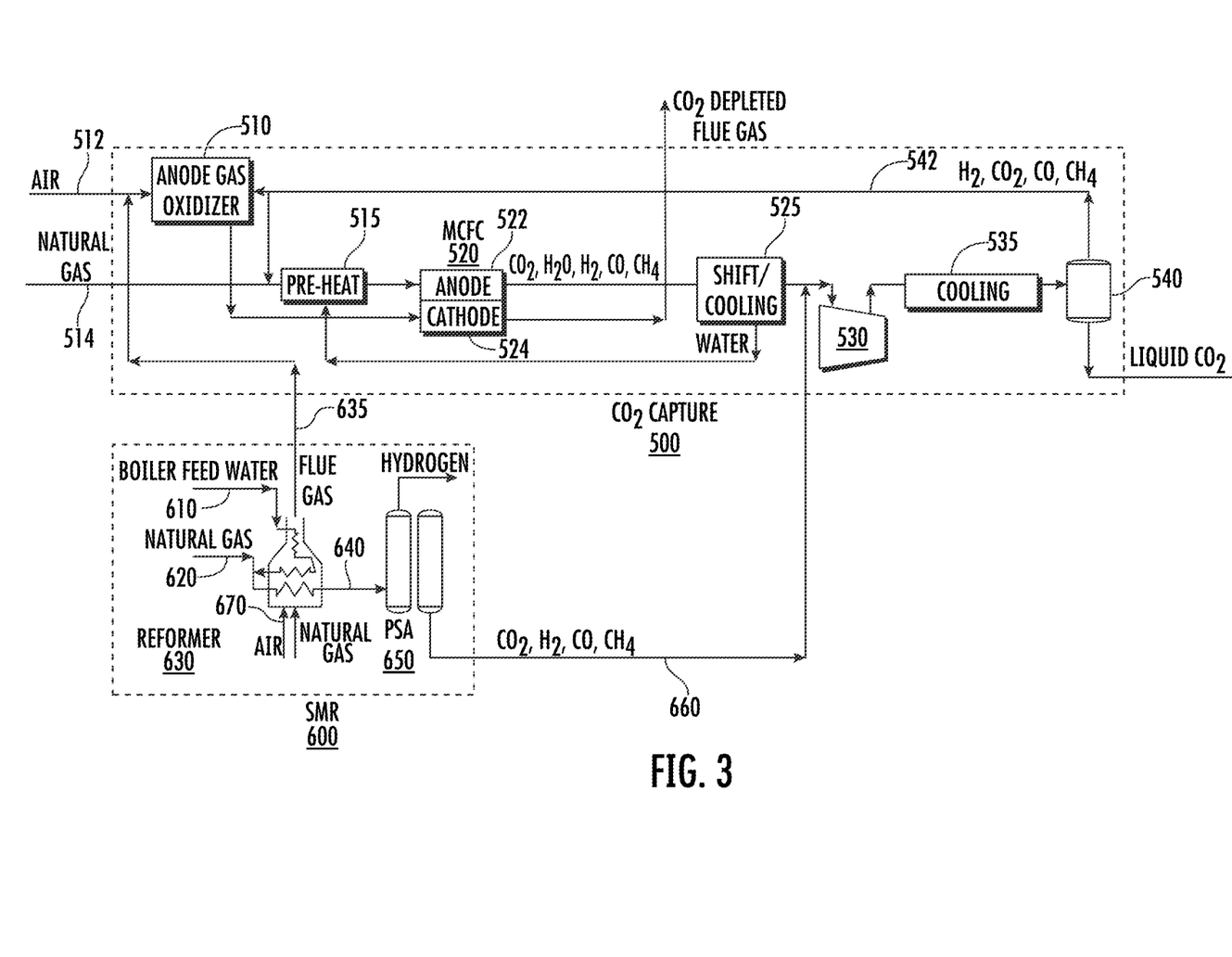
FIG. 3 shows a schematic view of a SMR-$CO_2$ capture system, in accordance with another representative embodiment.

Referring now to FIG. 3, a SMR-$CO_2$ capture system including a $CO_2$ capture system 500 and a SMR system 600 is shown according to another exemplary embodiment of the present disclosure. In contrast to the system of FIG. 2, the flue gas from the SMR system 600 is directed to the MCFC along a flue gas supply line 635 for $CO_2$ capture, instead of being vented. In addition, tail gas from a PSA 650 of the SMR system 600 is directed along a PSA tail gas supply line 660 to be mixed directly with an anode exhaust from the anode 522 of the MCFC 520 for capturing $CO_2$. In this way, the MCFC 520 can be sized to be smaller than in a typical SMR-$CO_2$ capture system (such as the system of FIG. 1), since the tail gas containing about 50-60% of the $CO_2$ normally present in the flue gas to be captured by the MCFC 520 is directed to the anode exhaust of the MCFC instead. Thus, this exemplary system can provide relatively higher $CO_2$ capture, as compared to the system of FIG. 2, while still reducing overall cost, as compared to the conventional system of FIG. 1.

According to another representative embodiment, the size of the MCFC 520 is configurable to offset the power consumed by the $CO_2$ capture system 500 and the SMR system 600. In this configuration, a relatively large percentage of the normally emitted $CO_2$ (e.g., about 60% to about 70%) would still be captured by the system, but the capital cost would be significantly reduced and the need to export power to a third party would be eliminated or reduced.

Figure 4:
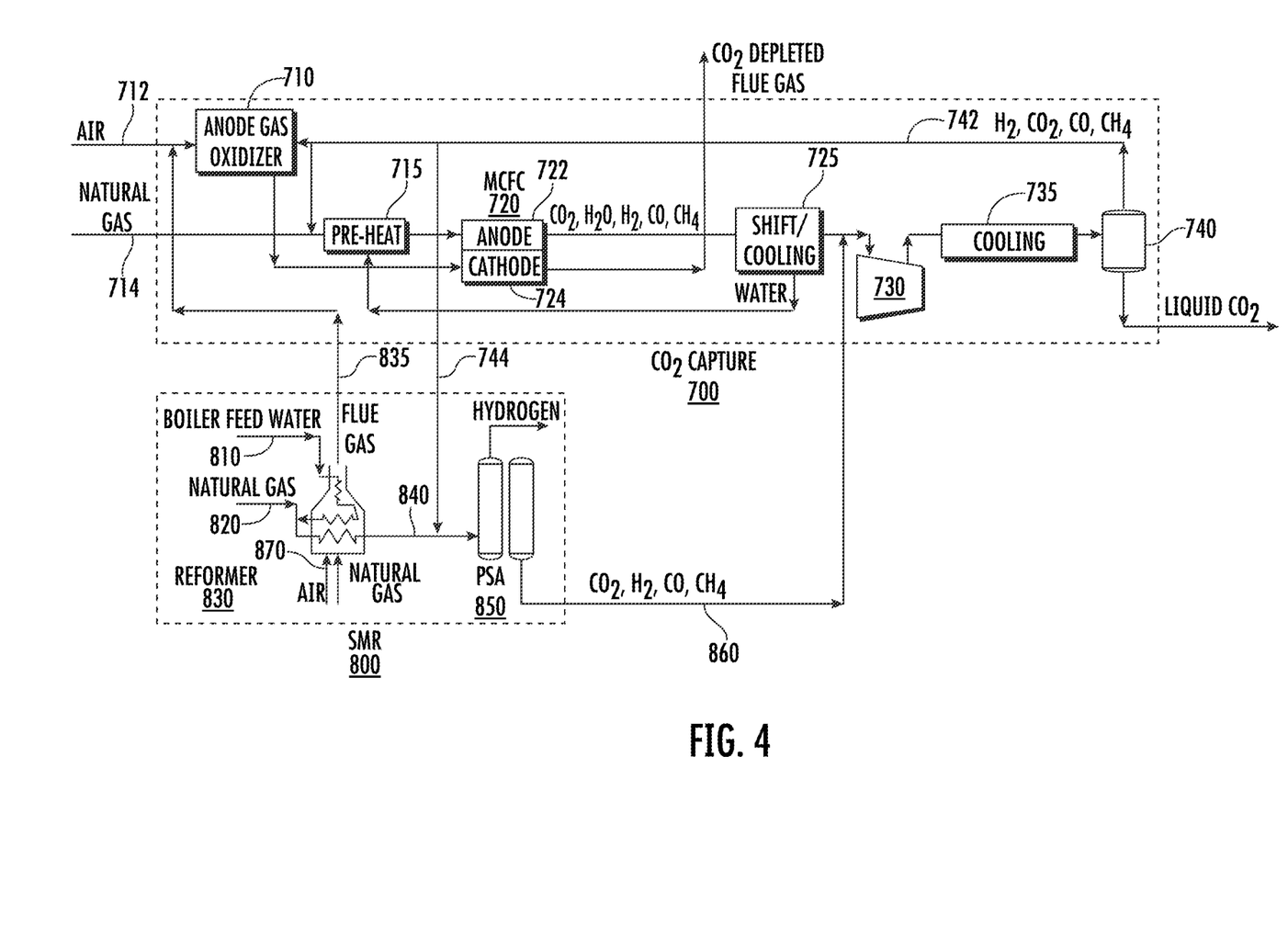
FIG. 4 shows a schematic view of a SMR-$CO_2$ capture system, in accordance with yet another representative embodiment.

Referring now to FIG. 4, a SMR-$CO_2$ capture system including a $CO_2$ capture system 700 and a SMR system 800 is shown according to another exemplary embodiment of the present disclosure. As shown in FIG. 4, flue gas from the SMR system 800 is directed along a flue gas supply line 835 to the cathode 724 of an MCFC 720, and tail gas from a PSA 850 of the SMR system 800 is directed along a PSA tail gas supply line 860 to be mixed directly with an anode exhaust from the anode 722 of the MCFC 720 for capturing $CO_2$.

The unused fuel from the anode 722 containing hydrogen and carbon monoxide (e.g., about 30%) with small amounts of methane, can be directed from the $CO_2$ capture tail gas to the PSA 850 along a $CO_2$ capture tail gas supply line 744 to increase the hydrogen production of the system. In some embodiments, the $CO_2$ capture tail gas could be sent to a separate PSA from the PSA 850 if, for example, the PSA 850 did not have the required capacity for the additional feed. In this manner, this exemplary system can provide for relatively high $CO_2$ capture and increased hydrogen production, while reducing overall cost.

Figure 5:
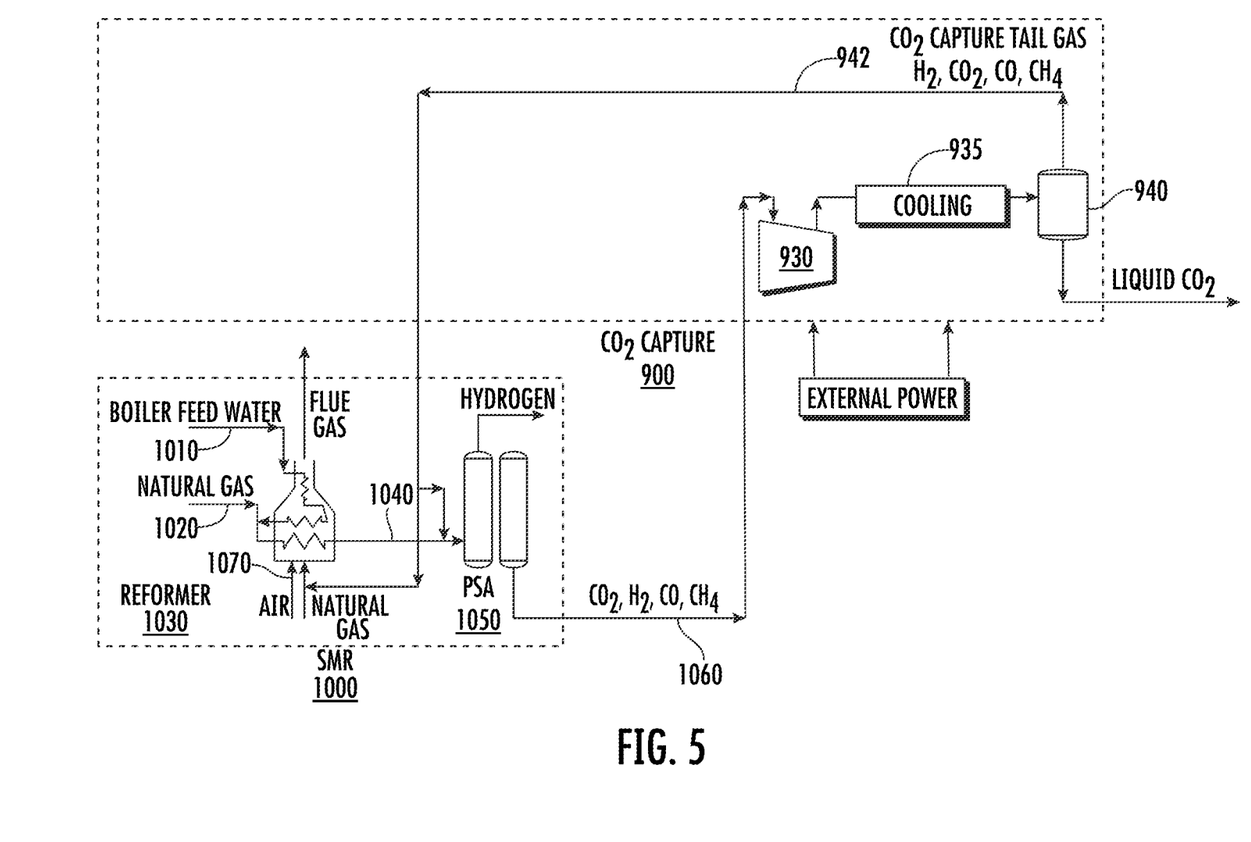
FIG. 5 shows a schematic view of a SMR-$CO_2$ capture system, in accordance with yet another representative embodiment.

Referring now to FIG. 5, a SMR-$CO_2$ capture system including a $CO_2$ capture system 900 and a SMR system 1000 is shown according to another exemplary embodiment of the present disclosure. As shown in FIG. 5, power is received from an external source instead of using an MCFC to power the $CO_2$ capture system 900. The external power source could be an existing power plant, utility grid, and/or renewable power such as solar or wind power, according to various exemplary embodiments. The tail gas from a PSA 1050 of the SMR system 1000 is compressed by the compressor 930 and cooled by the chiller 935, such that the liquefied $CO_2$ can be separated from the gas for capturing $CO_2$. The $CO_2$ capture tail gas may be directed along a PSA tail gas supply line 942 to the PSA 1050 and/or to the reformer 1030 of the SMR system 1000, so as to increase the hydrogen production of the system and helping to prevent build-up of inert gases in the SMR system 1000. In this manner, this exemplary system can provide a lower cost option for capturing $CO_2$, as compared to other $CO_2$ capture systems. It should be appreciated, however, that the amount of potential $CO_2$ that is released by the external power source should be taken into account when estimating the amount of $CO_2$ reduction with this configuration.

Figure 6:
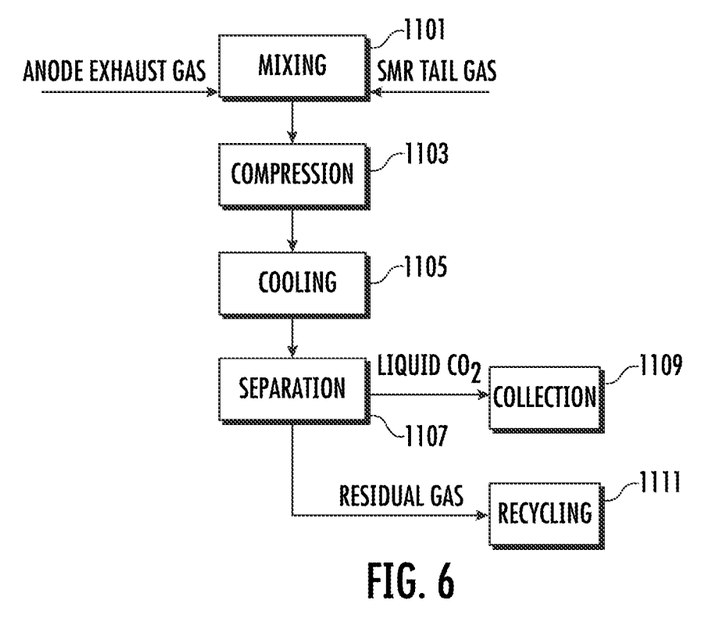
FIG. 6 shows a method of capturing $CO_2$ from a SMR, in accordance with a representative embodiment.

Referring to FIG. 6, a method of implementing the systems described above is shown according to an exemplary embodiment. The exemplary method includes a mixing step 1101 in which tail gas from the PSA of the SMR system is mixed with anode exhaust gas from the anode of the MCFC; a compression step 1103 in which the mixed gasses are compressed by a compressor; a cooling step 1105 in which the gases are cooled by, for example, a chiller such that most of the $CO_2$ is output as a liquid; a separation step 1107 in which the liquid $CO_2$ is separated from the residual gases by a $CO_2$ separator; a collection step 1109 in which the liquid $CO_2$ is collected to be sequestered or used for other purposes; and a recycling step 1111, in which the residual gases are recycled for use in one of more of an anode gas oxidizer, the anode of the MCFC, the SMR as a fuel source for the reformer, and the PSA to produce hydrogen gas. In certain embodiments, the mixing step 1101 is omitted and SMR tail gas is processed without mixing with anode exhaust gas, particularly when an external power source is used in place of a MCFC.

According to a representative embodiment, tail gas from a PSA in a SMR system is mixed directly with an anode exhaust gas from the anode of an MCFC, where the mixture can be compressed and its temperature lowered by a chiller, such that liquefied $CO_2$ can be separated from the mixture to be captured. The $CO_2$ from the combustor of the reformer of the SMR system, i.e. the flue gas from the SMR system, is not directed to the MCFC for $CO_2$ capture, as compared to some conventional SMR-$CO_2$ capture systems. In this way, the size of the MCFC is independent of the flue gas from the SMR reformer, and instead is governed by the $CO_2$ capture from the PSA tail gas, thereby reducing the overall cost of the system while still providing $CO_2$ capture.

According to another representative embodiment, flue gas from a SMR system is sent to the cathode of an MCFC, and tail gas from a PSA of the SMR system is mixed directly with an anode exhaust from the anode of the MCFC for capturing $CO_2$. In this way, the MCFC can be sized to be smaller than in a typical SMR-$CO_2$ capture system, since the tail gas containing about 50-60% of the $CO_2$ normally present in the flue gas to be captured by the MCFC is directed to the anode exhaust of the MCFC instead. Thus, this exemplary system can provide relatively high $CO_2$ capture while reducing overall cost of the system.

According to another representative embodiment, flue gas from a SMR system is sent to the cathode of an MCFC, and tail gas from a PSA of the SMR system is mixed directly with an anode exhaust from the anode of the MCFC for capturing $CO_2$. A portion of the unused fuel from the anode of the MCFC, following removal of $CO_2$ and containing hydrogen and carbon monoxide (CO) can be directed from the $CO_2$ capture tail gas to the PSA to increase the hydrogen production of the system. In this manner, this exemplary system can provide for relatively high $CO_2$ capture and increased hydrogen production, while reducing overall cost of the system.

According to another representative embodiment, the tail gas from a PSA of the SMR system is compressed and its temperature lowered by a chiller using an external power source (and, in cases where an absorption chiller is used, an external heat source), such that the liquefied $CO_2$ can be separated from the gas for capturing $CO_2$. The unused fuel from the $CO_2$ capture tail gas containing hydrogen, CO, residual $CO_2$, and other non-condensable gases may be directed to the PSA so as to increase the hydrogen production of the system, and/or to the reformer of the SMR system, helping to prevent build-up of inert gases in the SMR system. In this manner, this exemplary system can provide a lower cost option for capturing $CO_2$, as compared to some conventional SMR-$CO_2$ capture systems.

Disclosed herein are various embodiments of an enhanced SMR-$CO_2$ capture system capable of capturing $CO_2$ in a more efficient and cost effective manner, as compared to some conventional $CO_2$ capture systems using MCFC. The various embodiments disclosed herein may be capable of increasing the amount of $CO_2$ captured, improving efficiency of capturing $CO_2$, increasing the amount of hydrogen produced, and/or reducing costs associated with capturing $CO_2$.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the Figures. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention. For example, the heat recovery heat exchangers may be further optimized.

What is claimed is:

1. A system for producing hydrogen and capturing carbon from natural gas, the system comprising:
    a molten carbonate fuel cell comprising an anode and a cathode;
    a steam methane reformer system comprising a reformer and a pressure swing adsorption system configured to generate a tail gas; and
    a carbon dioxide capture system comprising:
        a compressor configured to compress a gas mixture, the gas mixture comprising exhaust gas from the anode and the tail gas;
        a chiller configured to cool the gas mixture; and
        a carbon dioxide separator configured to separate the gas mixture into liquefied carbon dioxide and a residual gas mixture.

2. The system of claim 1, further comprising:
    an anode gas oxidizer configured to receive a first portion of the residual gas mixture, wherein the anode of the molten carbonate fuel cell is configured to receive a second portion of the residual gas mixture.

3. The system of claim 2, wherein the reformer is configured to receive a third portion of the residual gas mixture to be burned as fuel.

4. The system of claim 3, wherein the pressure swing adsorption system is configured to receive a fourth portion of the residual gas mixture.

5. The system of claim 2, wherein the pressure swing adsorption system is configured to receive a third portion of the residual gas mixture.

6. The system of claim 2, wherein the reformer is configured to generate a flue gas that is vented to the atmosphere.

7. The system of claim 2, wherein the anode gas oxidizer is configured to receive flue gas from the reformer.

8. The system of claim 2, further comprising a second pressure swing adsorption system outside the steam methane reformer system, the second pressure swing adsorption system configured to receive a third portion of the residual gas mixture.

9. The system of claim 2, wherein the cathode is configured to receive oxidized gas from the anode gas oxidizer.

10. The system of claim 1, wherein the molten carbonate fuel cell is sized to power one of the carbon dioxide capture system or the steam methane reformer system.

11. The system of claim 1, wherein the molten carbonate fuel cell is sized to power both the carbon dioxide capture system and the steam methane reformer system.

12. A system for producing hydrogen and capturing carbon from natural gas, the system comprising:
    a molten carbonate fuel cell comprising an anode and a cathode, the anode configured to receive an anode input stream comprising natural gas and to output an anode exhaust stream comprising carbon dioxide;
    a steam methane reformer system comprising a reformer and a pressure swing adsorption system configured to receive a gas stream from the reformer and to separate the gas stream into a hydrogen stream and a tail gas comprising carbon dioxide;
    a compressor configured to compress a gas mixture, the gas mixture comprising the anode exhaust stream and the tail gas;
    a chiller configured to cool the gas mixture; and
    a carbon dioxide separator configured to separate the gas mixture into liquefied carbon dioxide and a residual gas mixture.

13. The system of claim 12, further comprises an anode gas oxidizer configured to receive a flue gas from the steam methane reformer system and output an oxidized flue gas to the cathode.

14. The system of claim 13, wherein the anode gas oxidizer is further configured to receive at least a portion of the residual gas mixture from the carbon dioxide separator.

15. The system of claim 12, wherein the anode is further configured to receive at least a portion of the residual gas mixture from the carbon dioxide separator.

16. The system of claim 12, wherein the pressure swing adsorption system is further configured to receive at least a portion of the residual gas mixture from the carbon dioxide separator and to separate hydrogen from the portion of the residual gas mixture.

17. The system of claim 12, wherein the reformer is configured to receive at least a portion of the residual gas mixture to be burned as fuel.

18. The system of claim 12, further comprising an evaporator configured to cool the anode exhaust stream and a shift reactor configured to convert carbon monoxide in the anode exhaust stream to carbon dioxide before the anode exhaust stream is received by the compressor.

19. The system of claim 12, wherein the molten carbonate fuel cell is sized to produce an amount of power approximately equal to the combined power consumed by a carbon dioxide capture system and the steam methane reformer system, wherein the carbon dioxide capture system comprises the compressor, the chiller and the carbon dioxide separator.

20. The system of claim 12, wherein the molten carbonate fuel cell is sized to operate using only the residual gas mixture in the anode input stream.

21. The system of claim 12, wherein the reformer is configured to generate a flue gas that is vented to the atmosphere.

\* \* \* \* \*